(12) United States Patent
Chambrion et al.

(10) Patent No.: US 10,240,645 B2
(45) Date of Patent: Mar. 26, 2019

(54) DUAL CLUTCH

(71) Applicant: Schaeffler Technologies AG & Co. KG, Herzogenaurach (DE)

(72) Inventors: Martin Chambrion, Geispolsheim (FR); Johannes Ruf, Buhl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 62 days.

(21) Appl. No.: 15/504,391

(22) PCT Filed: Aug. 11, 2015

(86) PCT No.: PCT/DE2015/200439
§ 371 (c)(1),
(2) Date: Feb. 16, 2017

(87) PCT Pub. No.: WO2016/029912
PCT Pub. Date: Mar. 3, 2016

(65) Prior Publication Data
US 2017/0261043 A1 Sep. 14, 2017

(30) Foreign Application Priority Data

Aug. 29, 2014 (DE) .......................... 10 2014 217 277
Mar. 23, 2015 (DE) .......................... 10 2015 205 146

(51) Int. Cl.
*F16D 13/56* (2006.01)
*F16D 13/58* (2006.01)
(Continued)

(52) U.S. Cl.
CPC .............. *F16D 13/56* (2013.01); *F16D 13/04* (2013.01); *F16D 13/54* (2013.01); *F16D 13/58* (2013.01);
(Continued)

(58) Field of Classification Search
CPC ..... F16D 2021/0676; F16D 2021/0607; F16D 2021/0638; F16D 2021/0661
See application file for complete search history.

(56) References Cited

U.S. PATENT DOCUMENTS 8,464,852 B2    6/2013  Simon et al.
8,528,714 B2 *  9/2013  Agner .................. F16D 13/648
                                                         192/48.619
(Continued)

FOREIGN PATENT DOCUMENTS

CN    101109422    1/2008
CN    102155500    8/2011
(Continued)

*Primary Examiner* — Mark A Manley
(74) *Attorney, Agent, or Firm* — Volpe and Koenig, P.C.

(57) ABSTRACT

A dual clutch device having an input side, a first output side, and a second output side, which are arranged rotatably about an axis of rotation, and having a first, radially outer friction clutch for producing frictional engagement between the input side and the first output side and a second, radially inner friction clutch for producing frictional engagement between the input side and the second output side. Each friction clutch has a first friction element, which engages in the input side in a torque-transmitting manner, a second friction element, which engages in the associated output side in a torque-transmitting manner, a control element for providing an axially pressing force on the friction elements, and a leaf spring element, which is spirally wound around the axis of rotation and which is arranged axially between the control element and the friction elements.

7 Claims, 4 Drawing Sheets

(51) Int. Cl.
*F16D 13/04* (2006.01)
*F16D 21/06* (2006.01)
*F16D 13/54* (2006.01)

(52) U.S. Cl.
CPC ...... *F16D 21/06* (2013.01); *F16D 2021/0676* (2013.01)

(56) References Cited

U.S. PATENT DOCUMENTS

| | | | |
|---|---|---|---|
| 2005/0139023 A1 | 6/2005 | Kraxner et al. | |
| 2008/0018033 A1 | 1/2008 | Hiroki et al. | |
| 2008/0283330 A1* | 11/2008 | Ebner | F16D 21/06 180/381 |
| 2010/0200353 A1* | 8/2010 | Wooden | F16D 21/06 192/48.8 |

FOREIGN PATENT DOCUMENTS

| | | |
|---|---|---|
| DE | 102010005601 | 8/2010 |
| DE | 102010021899 | 12/2011 |
| DE | 102010051446 | 2/2012 |
| EP | 1757831 | 2/2007 |
| WO | 2010081455 | 7/2010 |
| WO | 2011050772 | 5/2011 |
| WO | 2011050775 | 5/2011 |

\* cited by examiner dual clutch

BACKGROUND

The invention relates to a dual clutch. In particular the invention relates to a dual clutch for the use in a motorcycle.

A dual clutch is used in connection with a dual clutch transmission in order to perform a change in gears between successive gears in a rapid and precise fashion. Here, a drive engine acts upon an input side of the dual clutch and two friction clutches that can be controlled independent from each other can each generate a frictional engagement to an allocated transmission input shaft. A pair of toothed wheels may be active at each transmission input shaft, with the pairs of toothed wheels of the different transmission input shafts usually acting upon the same output shaft. When the first clutch is opened and the second one is closed, a predetermined gear is engaged. In order to change gears, the first clutch is opened and the second one is closed.

In order to transfer the technology of the dual clutch and/or the dual clutch transmission from a motor vehicle to a motorcycle some framework conditions must be observed. For example an actuating force must be applied manually for the two friction clutches, commonly by the rider of the motorcycle. If the torque to be transferred is strong, the rider can be overwhelmed over an extended period of time. In order to reduce the clutch forces to be applied manually it is known to use manually operated auxiliary clutches and a main clutch that can be operated by the auxiliary clutch. WO 2011/050772 A1 and WO 2011/050775 A1 show exemplary embodiments for such devices, also called power clutches.

Power clutches may however require a relatively large structural space and are associated with certain complexity. For example, for a dual clutch with two power clutches a total of four clutches must be designed, with their cooperation being subject to precise controlling. Such a complex dual clutch can lead to increased costs for development and production.

SUMMARY

The objective of the present invention is to provide an improved dual clutch, particularly for the use in a motorcycle. The invention attains this objective via a dual clutch device comprising one or more features of the invention. Preferred exemplary embodiments are discussed below.

A dual clutch device comprises an input side, a first output side, and a second output side, which are arranged rotationally about an axis of rotation, further a first, radially outer friction clutch for generating a frictional engagement between the input side and the first output side and a second radial inner friction clutch for generating a frictional engagement between the input side and the second output side. Here, each friction clutch comprises a first friction element, which engages the input side in a torque-proof fashion, a second friction element which engages the corresponding output side in a torque-proof fashion, a control element for providing an axial compression upon the friction elements, and a leaf spring element, which is arranged axially between the control element and the friction elements.

The leaf spring element may provide an amplification of the compression depending on a distortion of its ends. By the use of the principle of spring elements an actuating force for clutches can be reduced so that an actuating system for the friction clutches can be designed in a simplified fashion or sized smaller. The stress of an auxiliary energy source provided for actuation, for example a hydraulic pump or an electric system, can be kept low thereby. The overall weight of a surrounding vehicle, particularly a motorcycle, can be kept low. In case of manual operation of the frictional clutches a low force to be applied by the driver can be realized such that relaxed driving can be supported with gear shifting that is hardly strenuous. Additionally, the use of the radially offset flat spring—clutches can contribute to saving axial structural space of the dual clutch device. This way the unit comprising the dual clutch device and a drive engine or a transmission can be designed narrower so that a diagonally positioned angle of the motorcycle can be large in which the dual clutch device is installed.

The flat spring element can particularly be positioned at an angle about the axis of rotation or wound spirally. A spiral or helical line is a curve which extends about a point or an axis and, depending on the perspective of the observer, increases or decreases the distance thereto. An angular element forms an acute angle with the axis of rotation; however it extends straight and extends not about the axis of rotation. This angular or spirally wound leaf spring element can be designed in a particularly compact fashion in the axial direction and implement particularly well the desired amplification of the axial compression upon the friction elements.

Preferably an axially extending section of the input side is implemented for the purpose of engaging the first friction element of the first friction clutch radially at the outside in a form-fitting fashion and the first friction element of the second friction clutch radially at the inside in a form-fitting fashion.

By arranging the friction clutches on different radial sides of a common element, namely the axial section of the input side, a radially compact design of the dual clutch device can be yielded. The number of the components required for the dual clutch device can be reduced. This way production costs can be lowered.

The section can be produced in one piece from sheet metal. This way production costs can be reduced. Additionally, engagement structures that can be used for the transmission of force can be used radially inside and radially outside in reference to the first friction element, can be formed easily and cost-effectively.

Several friction elements may be provided at each friction clutch. This way multi-disc clutches result which can be used advantageously, particularly for the application in a motorcycle.

The dual clutch device can be implemented for the purpose to run in an oil bath. This embodiment is also called wet or wet-running, and can facilitate cooling, lubrication, or cleaning of elements of the dual clutch device. Additionally a response behavior by slide friction of friction elements engaging each other can be controlled easier. Any integration with a transmission, also running in an oil bath, can be facilitated here.

Here, an axial actuating element may be included, which acts upon the leaf spring element of a friction clutch, with the leaf spring element being embodied, when an axial compression force is missing, to compress the friction elements upon the actuating element so that the friction clutch closes. This embodiment is also called "normally closed".

In another embodiment an axial actuating element is provided which acts upon the leaf spring element of a friction clutch, with the leaf spring element being embodied to press the friction elements apart when an axial operating force upon the actuating element is missing, so that the friction clutch opens. This embodiment is also called "normally open".

The two latter embodiments can be combined with each other, by one friction clutch being opened upon activation and the other one being closed upon activation. This way advantages develop when providing actuating forces.

BRIEF DESCRIPTION OF THE DRAWINGS

The invention is now explained in greater detail with reference to the attached figures. Here it shows in detail.

DETAILED DESCRIPTION OF THE PREFERRED EMBODIMENTS

Figure 1:
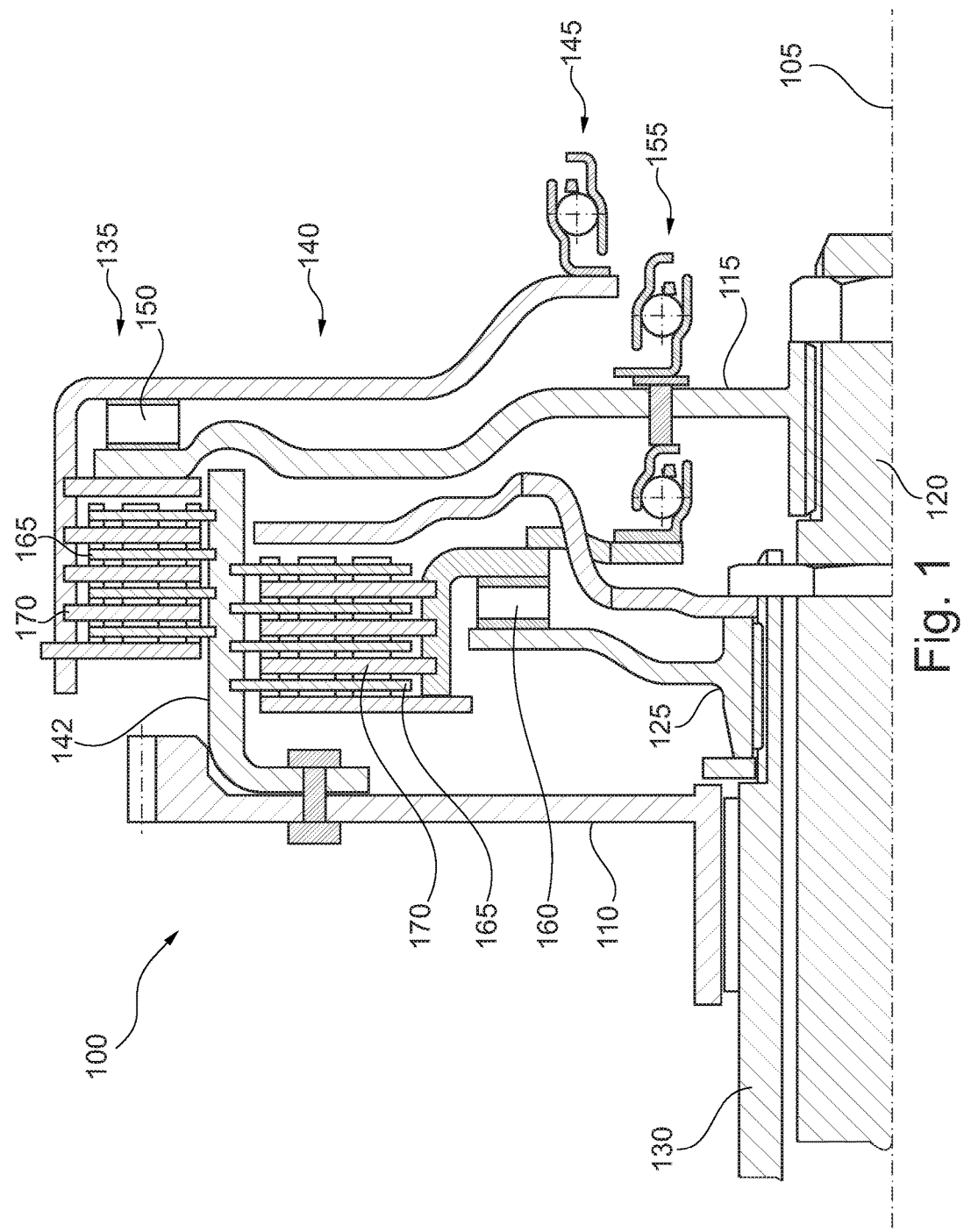
FIG. 1 a longitudinal section through a dual clutch device.

FIG. 1 shows a longitudinal section through a dual clutch device 100. An input side 110 for connecting to a drive engine, a first output side 115 for connecting to a first transmission input shaft 120, and a second output shaft 125 for connecting to a second transmission input shaft 130 are arranged about an axis of rotation 105. The transmission input shafts 120 and 130 are preferably embodied coaxially in reference to the axis of rotation 105.

A first friction clutch 135 for the production of a friction-fitting engagement between the input side 110 and the first output side 115 and a second friction clutch 140 for generating a friction-fitting engagement between the input side 110 and the second output side 125 are arranged radially offset in reference to each other. In one embodiment, selected as an example, the first friction clutch 135 is opened without actuation ("normally open") and the second friction clutch 140 is closed without actuation ("normally closed"). In FIG. 1 the first friction clutch 135 is opened because it is not actuated, and the second friction clutch 140 is opened because it is actuated.

As shown, it is preferred that an axially extending section 142 of the input side 110 is used equally for the torque-proof engagement of the first friction clutch 135 and the second friction clutch 140. This section 142 is combined with a radially extending section in an exemplary fashion; in other embodiments here a one-piece implementation of the two sections may be given as well. The section 142 is preferably implemented to embody torque-proof counter supports both for the friction elements of the outer first friction clutch 135 as well as the inner second friction clutch 140. As illustrated, the friction elements of both friction clutches 135, 140 may engage in a form-fitting fashion and preferably also in a manner axially displaceable in the section 142. For this purpose, the section 142 may carry outer gear teeth engaged by the friction elements of the first friction clutch 135, and an interior gear teeth engaged by the friction elements of the second friction clutch 140. In another embodiment the section 142 comprises a strip of circumferential material with constant thickness about the axis of rotation 105, which is formed such that alternating it extends at two different radii about the axis of rotation so that exterior gear teeth and interior gear teeth develop.

A first actuating device 145 and a first leaf spring element 150 are allocated to the first friction clutch 135, a second actuating device 155 and a second leaf spring element 160 to the second friction clutch 140. The leaf spring elements 150 and 160 act oppositely the actuating devices 145 and 155 in the axial direction. In the embodiment shown the leaf spring elements 150 and 160 each cause the closing of the friction clutches 135 and 140, while any actuation via the activation device 145 and 155 respectively cause an opening of the friction clutches 135 and 140. This constellation is also called "normally closed"; equivalently a "normally open" arrangement is also possible, in which the respective actuating device 145, 155 is used for closing and the respective leaf spring element 150, 160 for opening the allocated friction clutch 135, 140. Further, in the embodiment shown a "sliding" motion of the friction clutches 135, 140 is provided, with an axially acting compression force acting upon the activation devices 145, 155 in order to operate them. In one alternative embodiment a "tensile" activation of the devices 145, 155 may occur as well. The activation of the devices 145, 155 may for example occur via an electric or hydraulic actuator.

The friction clutches 135 and 140 respectively comprise a plurality of blades 165 and friction disks 170, which are provided alternating as axially arranged stacks. Blades 165 engage in a torque-proof fashion at the input side 110 and the friction disks 170 at the corresponding output sides 115, 125. In other embodiments blades 165 and friction disks 170 can also be inversed or exclusively blades 165 or exclusively friction disks 170 may be used. Preferably another friction coating is provided between axially contacting elements 165, 170.

Figure 2:
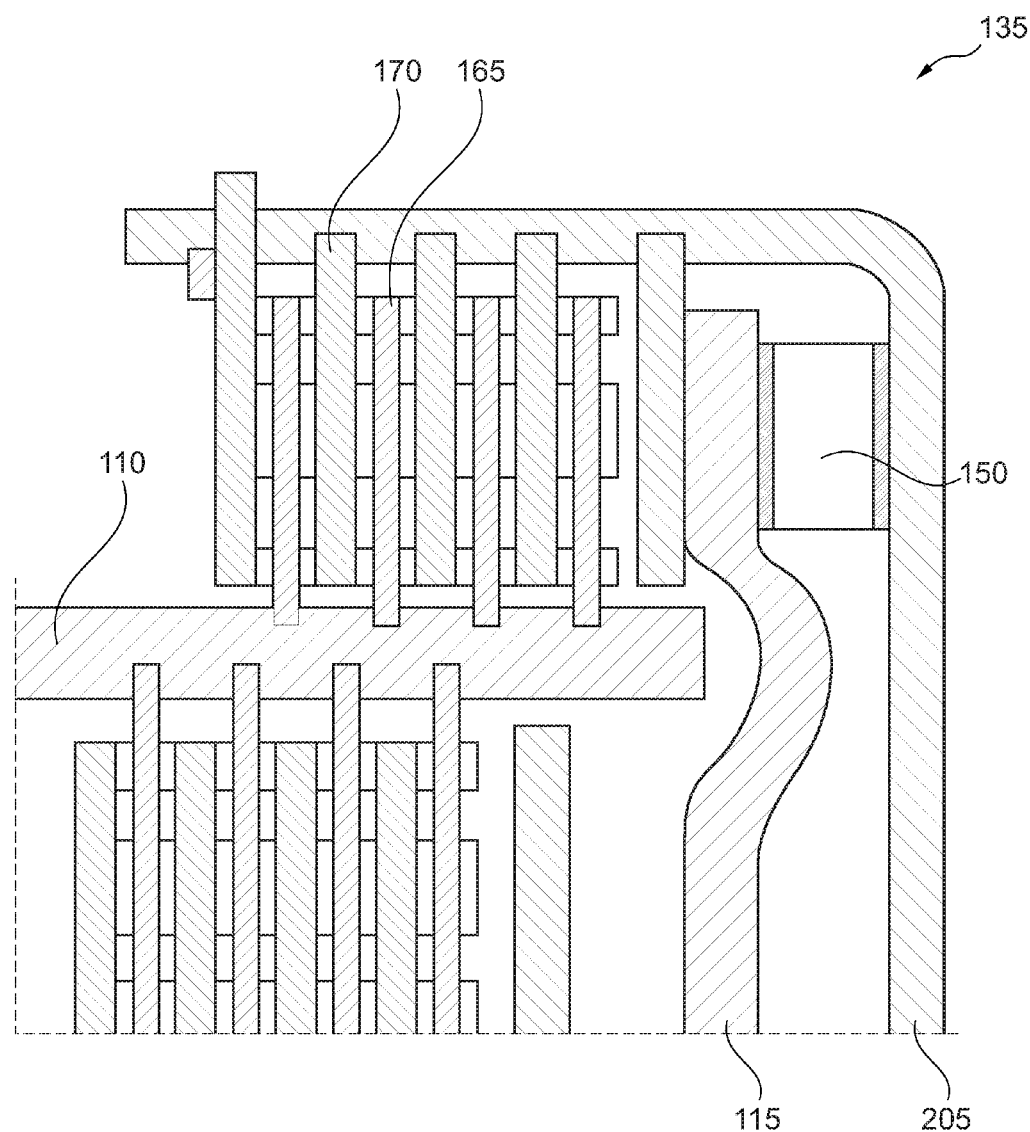
FIGS. 2 and 3 details of the dual clutch device of FIG. 1.

FIG. 2 shows in detail the dual clutch device 100 in the proximity of the first friction clutch 135. The output side 115 comprises a radially circumferential section, engaged by the friction disks 170 in a torque-proof fashion, and an optional axially extending section for the torque-proof connection to the first transmission input shaft 120. These two sections are connected to each other in a torque-proof fashion. The first actuating device 145 comprises a control element 205, which is connected to the first output side 115. The embodiment shown represents a one-piece connection to the radial section of the output side 115. The control element 205 extends radially inwardly, with the first leaf spring element 150 being arranged between the control element and one end of the stack of blades 165 and friction disks 170. The leaf spring element 150 extends in a preferred embodiment spirally about the axis of rotation 105 or is angular with regards to the axis of rotation 105, and preferably further exhibits a strong spring-stiffness in order to transfer even a minor axial motion of the control element 205 to the stack of blades 165 and friction disks 170. This way a friction-fitting connection can be generated between the input side 110 and the output side 115 so that torque can be transmitted by the friction clutch 135. The relative rotation of the input side 110 in reference to the first output side 115 subjects the leaf spring element 150 to compression strain. This way, the leaf spring element 150 can get wedged slightly between the control element 205 and the end of the stack of blades 165 and friction disks 170 so that an axial expansion force develops which increases the compression force acting axially upon the blades 165 and the friction disks 170. The closing force upon the friction clutch 135 is in this case increased by a portion of the torque transmitted via the friction clutch 135. The compression force acting upon the blades 165 and the friction disks 170 can therefore be greater by many times than an originally caused compression force of the control element 205, before a friction-fitting engagement occurs between the blades 165 and the friction disks 170. The engagement of the friction clutch 135 can therefore occur with lower force than upon the blades 165 and the friction disks 170 so that for example via manual actuation strong torque can be coupled or decoupled securely via the friction clutch 135.

Figure 3:
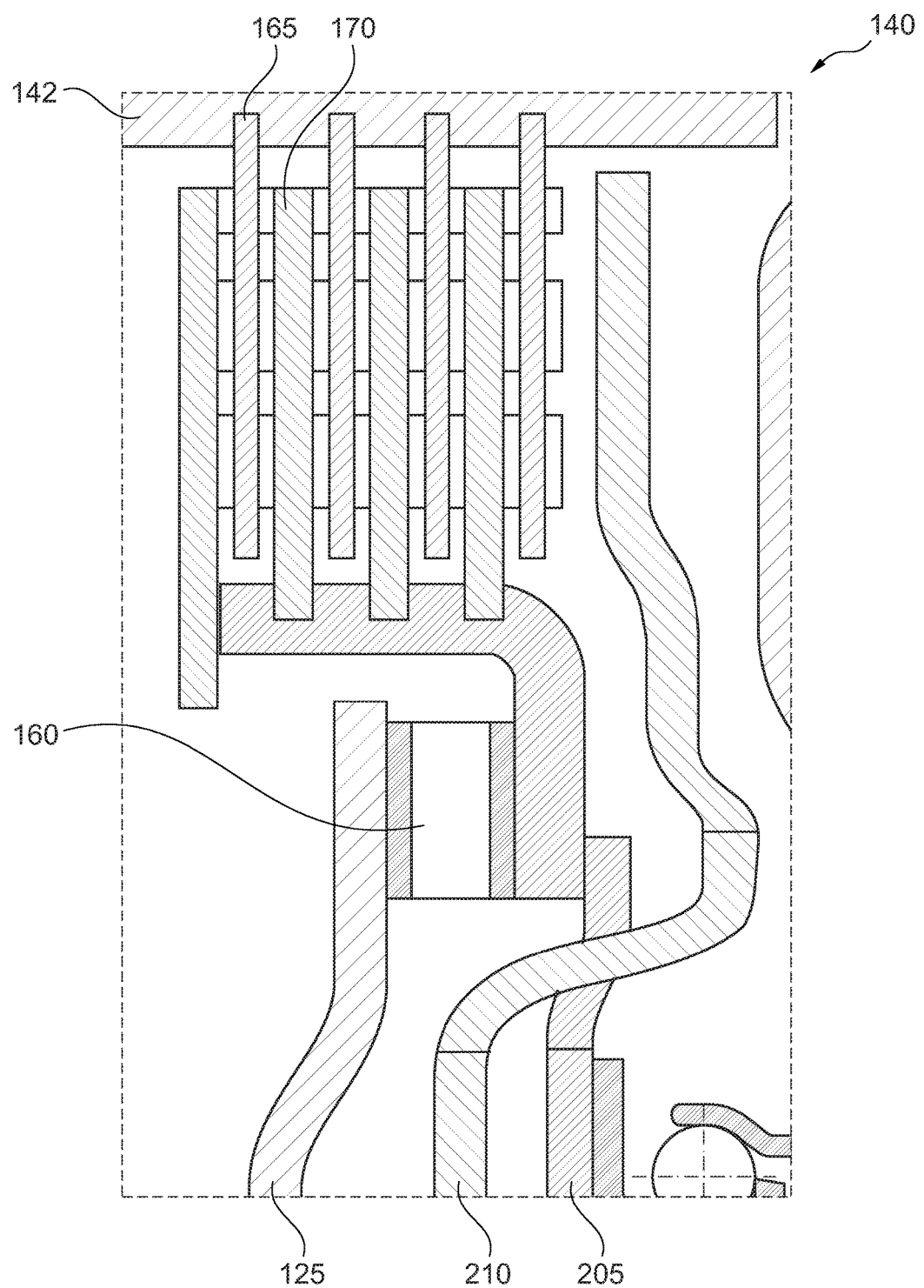

FIG. 3 shows a detail of the dual clutch 100 of FIG. 1 in the proximity of the second friction clutch 140. The second friction clutch 140 is opened by an axial actuating force upon the control element 205. The actuating force compresses the second leaf spring element 160 in the axial direction. Just like the first leaf spring element 150 the second leaf spring element 160 preferably comprises an element, angular in reference to the axis of rotation 105 or in a spiral element, which extends about the axis of rotation 105. If the axial actuation force of the control element 250 reduces in FIG. 3 towards the left, the second leaf spring element 160 relaxes and pushes the stack of blades 165 and the friction disks 170 against the counter bearings 210 such that the stack is compressed and the blades 165 come into a friction-fitting engagement with the friction disks 170. This way torque develops between the second output side 125 and the control element 205 so that the second leaf spring element 160 is compressed along its spiral direction of extension. The second leaf spring element 160 inverts the force of distortion so that an additional axial force develops. The stack of blades 165 and the friction disks 170 are therefore pressed more strongly towards the counter bearings 210 so that the friction-fitting engagement strengthens.

In this variant as well a portion of the force transmitted via the second friction clutch 140 can be used to close the second friction clutch 140. A self-enhancement of the applied actuating force develops upon the control element 205. The second friction clutch 140 can therefore also be closed tightly while applying only minor actuating forces so that even a strong torque can be transmitted between the input side 110 and the output side 125.

Figure 4:
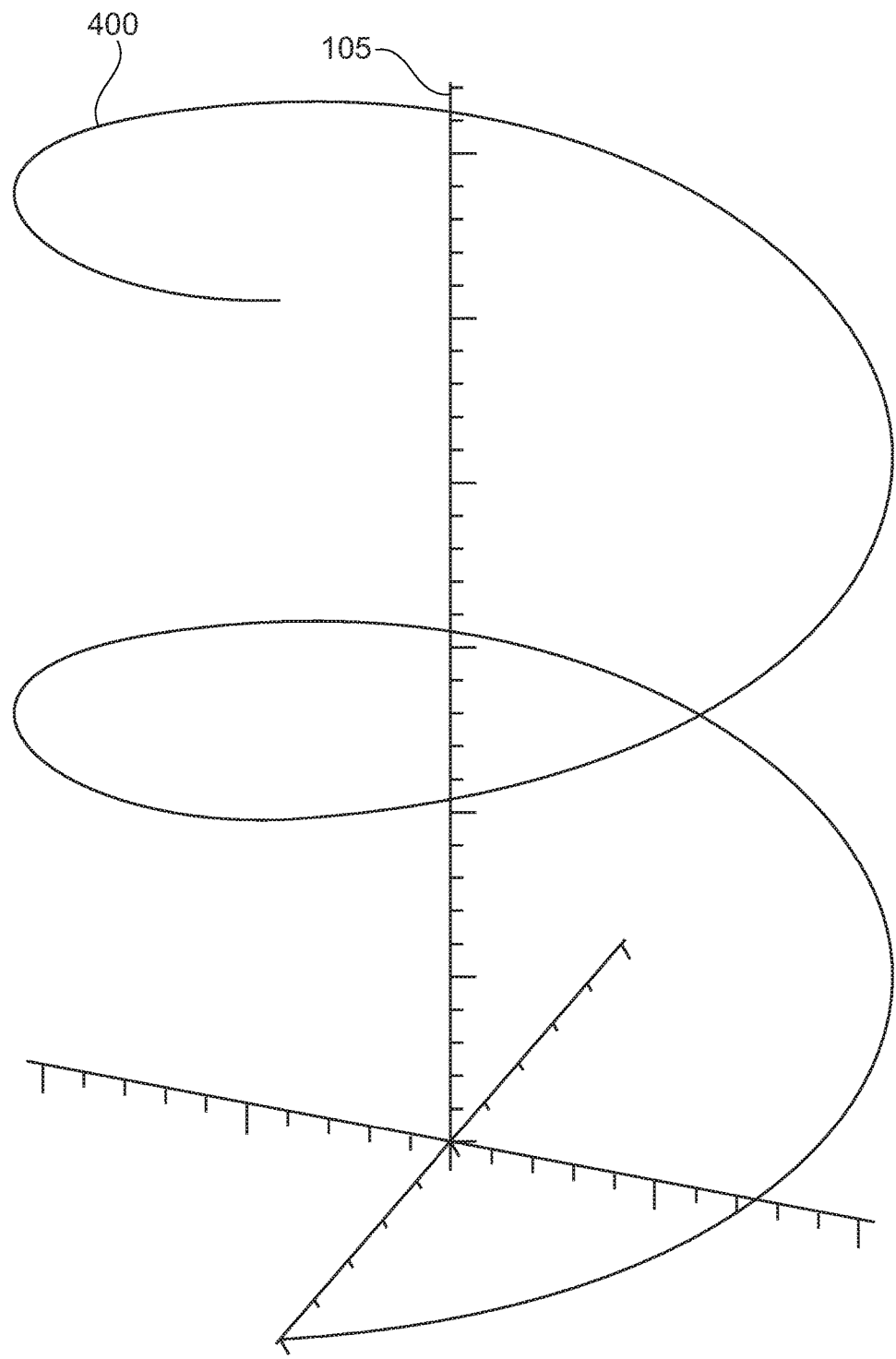
FIG. 4 variants of the embodiment of the dual clutch device of FIGS. 1 to 3.

FIG. 4 shows a schematic illustration of a helix 400. A section of the helix 400, which covers preferably less than 360° about an axis of rotation 105, defines the preferred form of a leaf spring element 150 and 160 when it is embodied in a spiral shape. With regards to the preferred direction of transmission of torque by the dual clutch device 100 the direction of rotation of the helix 400 is selected such that the described claim for compression occurs along the direction of extension when the respective friction clutch 135, 140 shall be closed. In other words, by distorting the ends of a leaf spring element 150, 160 in the direction of compression about the axis of rotation 105 here an axial expansion force can be applied upon the ends of the spring leaf element 150, 160.

A spiral leaf spring element 150, 160 with the shape of the helix 400 shown in FIG. 4 extends in one view upon the axis of rotation 105 clockwise away from the observer. When the end facing the observer is distorted clockwise in reference to the other end about the axis of rotation 105 here an axial expansion force develops upon the ends of the leaf spring element 150, 160 along the axis of rotation, which drives the ends axially apart. In one of the previous figures the distorting motion develops in one of the friction clutches 135, 140 by the leaf spring element 150, 160 being axially compressed to elements with different rotations. By the distorting effect the compression is strengthened so that minor compression and/or actuating force can be sufficient to trigger an opening and/or closing process of the corresponding friction clutch 135, 140. A portion of the torque transmitted via the friction clutch 135, 140 is here used for providing the axial force upon the friction elements 165, 170.

In another embodiment one of the spiral leaf spring elements 150, 160 comprises several of the elements shown, which are screwed into each other. In a further embodiment one of the leaf spring elements 150, 160 is interrupted at the circumferential side.

LIST OF REFERENCE CHARACTERS

100 Dual clutch device
105 Axis of rotation
110 Input side
115 First output side
120 First transmission input shaft
125 Second output side
130 Second transmission input shaft
135 First friction clutch
140 Second friction clutch
145 First actuating device
150 First leaf spring element
155 Second actuating element
160 Second leaf spring element
165 Blade
170 Friction disk
205 Control element
210 Counter bearing

The invention claimed is:

1. A dual clutch device comprising:
an input side, a first output side, and a second output side each arranged rotational about an axis of rotation;
a first, radially outer friction clutch for generating a friction-fitting engagement between the input side and the first output side, the first friction clutch including:
a first friction element engaged with the input side in a torque-proof fashion;
a second friction element engaged with the first output side in a torque-proof fashion;
a first control element for providing an axial compression upon the first friction element and the second friction element; and
a first leaf spring element;
a second, radially inner friction clutch for generating a friction-fitting engagement between the input side and the second output side, the second friction clutch including:
a third friction element engaged with the input side in a torque-proof fashion;
a fourth friction element engaged with the second output side in a torque-proof fashion;
a second control element for providing an axial compression upon the third friction element and the fourth friction element; and
a second leaf spring element;
at least one of the first leaf spring element or the second leaf spring element is wound spirally about the axis of rotation by less than 360°; and
wherein:
the first leaf spring element is arranged axially between (i) the first control element and (ii) the first friction element or the second friction element; or
the second leaf spring element is arranged axially between (i) the second control element and (ii) the third friction element or the fourth friction element.

2. The dual clutch device according to claim 1, further comprising an axial actuating element, and
at least one of:
the axial actuating element acts upon the first leaf spring element, the first leaf spring element spreading the first friction element and the second friction element apart from the actuating element when an axial actuating force from the axial actuating element is missing so that the first friction clutch opens, or the axial actuating element acts upon the second leaf spring element, the second leaf spring element spreading the third friction element and the fourth friction element apart when the axial actuating force from the axial actuating element is missing so that the second friction clutch opens.

3. The dual clutch device according to claim 1, wherein an axially extending section of the input side is implemented to engage radially at an outside and in a form-fitting fashion the first friction element of the first friction clutch and radially at an inside and in a form-fitting fashion the third friction element of the second friction clutch.

4. The dual clutch device according to claim 3, wherein the axially extending section is produced in one piece from sheet metal.

5. The dual clutch device according to claim 1, wherein respectively several of the friction elements are provided.

6. The dual clutch device according to claim 1, wherein the dual clutch device is embodied to run in an oil bath.

7. A dual clutch device comprising:
an input side, a first output side, and a second output side each arranged rotational about an axis of rotation;
a first, radially outer friction clutch for generating a friction-fitting engagement between the input side and the first output side, the first friction clutch including:
a first friction element engaged with the input side in a torque-proof fashion;
a second friction element engaged with the first output side in a torque-proof fashion;
a first control element for providing an axial compression upon the first friction element and the second friction element; and
a first leaf spring element arranged axially between (i) the first control element and (ii) the first friction element or the second friction element;
a second, radially inner friction clutch for generating a friction-fitting engagement between the input side and the second output side, the second friction clutch including:
a third friction element engaged with the input side in a torque-proof fashion;
a fourth friction element engaged with the second output side in a torque-proof fashion;
a second control element for providing an axial compression upon the third friction element and the fourth friction element; and
a second leaf spring element; and
an axial actuating element; and
at least one of:
the axial actuating element acts upon the first leaf spring element, the first leaf spring element compressing the first friction element and the second friction element when an axial actuating force from the axial actuating element is missing so that the first friction clutch closes, or the axial actuating element acts upon the second leaf spring element, the second leaf spring element compressing the third friction element and the fourth friction element when the axial actuating force from the axial actuating element is missing so that the second friction clutch closes.

* * * * *